United States Patent
Britton et al.

(10) Patent No.: US 6,944,715 B2
(45) Date of Patent: Sep. 13, 2005

(54) VALUE BASED CACHING

(75) Inventors: Edward Glen Britton, Chapel Hill, NC (US); Wesley McMillan Devine, Apex, NC (US); Lap Thiet Huynh, Apex, NC (US); Bala Rajaraman, Cary, NC (US); Arthur James Stagg, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 10/217,713

(22) Filed: Aug. 13, 2002

(65) Prior Publication Data

US 2004/0034740 A1 Feb. 19, 2004

(51) Int. Cl.[7] ............................................. G06F 12/12
(52) U.S. Cl. ...................................... 711/129; 711/133
(58) Field of Search ............................. 711/129, 133, 711/136, 173, 118; 709/223

(56) References Cited

U.S. PATENT DOCUMENTS

| | | | | |
|---|---|---|---|---|
| 5,394,531 A | * | 2/1995 | Smith | ......................... 711/136 |
| 5,553,262 A | | 9/1996 | Yamada | |
| 5,787,490 A | | 7/1998 | Ozawa | |
| 5,829,025 A | | 10/1998 | Mittal | |
| 6,223,256 B1 | * | 4/2001 | Gaither | ...................... 711/134 |

* cited by examiner

Primary Examiner—Pierre M. Vital
(74) Attorney, Agent, or Firm—Steven M. Greenberg; Jerry W. Herndon

(57) ABSTRACT

A value-based caching system and method. A value based cache method can include partitioning a cache into different value-based partitions. Data to be stored in the cache can be valued and the valued data can be cached in individual ones of the value-based partitions. Subsequently, cache entries can be evicted from the value-based partitions. Finally, the caching and evicting can be managed according to the valuing step. In this regard, the cache and eviction management step can ensure greater cache responsiveness for data having a greater value relative to other valued data.

4 Claims, 3 Drawing Sheets

VALUE BASED CACHING

BACKGROUND OF THE INVENTION

1. Statement of the Technical Field

The present invention relates to the cache management and more particularly to providing differentiated service in a caching system.

2. Description of the Related Art

The modern global network can be viewed as a complex interweaving of multiple network technologies, server platforms, client capabilities and application requirements. The vast majority of network technologies handle device requests indiscriminately. That is, regardless of the identity of the requester or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In that regard, quality of service (QoS) terms specify a guaranteed level of responsiveness minimally owed to particular content, services, or for a particular requester. The policy based service differentiation model is the logical result of several factors. Firstly, the number and variety of computing applications which generate requests across networks both private and public has increased dramatically in the last decade. Each of these applications, however, has different service requirements.

Secondly, technologies and protocols that enable the provision of different services having different levels of security and QoS have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

As device requests flow through the network and ultimately, to a file system, storage systems provide the terminal point of data access. More particularly, in response to any data request originating in a network, a file storage device such as disk media ultimately physically retrieves the requested data. Accordingly, data caching systems at all levels of the network replicate data that ultimately can be physically retrieved from file storage. Like other elements of the network, however, In high request volume circumstances, response times attributable to file storage access can add considerable costs to the overall response time.

1. Within the modern enterprise, the enterprise can receive a substantial benefit for effectively providing differentiated service to different customers and different data so that some customers and data receive a higher level of service than other customers and data on the network. That is to say, where the enterprise satisfies the expected service level of a valued customer, the enterprise can retain the customer. Conversely, where the enterprise fails to satisfy the expected level of service of a valued customer, the enterprise likely can lose the customer. Hence, differentiated service can be an important component of e-commerce in as much as a customer always can be viewed as merely "one click away" from a competitor's system where response times falter. Yet, at present storage systems lack a means to reflect the value of data stored in a cache based upon the benefit likely to be received by the operator of the storage system when the storage system provides a particular level of differentiated service.

SUMMARY OF THE INVENTION

The present invention is a value-based caching system and method. A value based cache method can include partitioning a cache into different value-based partitions. Data to be stored in the cache can be valued and the valued data can be cached in individual ones of the value-based partitions. Subsequently, cache entries can be evicted from the value-based partitions. Finally, the caching and evicting can be managed according to the valuing step. In this regard, the cache and eviction management step can ensure greater cache responsiveness for data having a greater value relative to other valued data.

In one aspect of the invention, the managing step can include assigning a guaranteed partition size to at least one of the value-based partitions; permitting other ones of the value-based partitions to change to accommodate cache requests for data having a value which differs from the value-based partition having the guaranteed partition size; and, caching only data of like value in the value-based partition having the guaranteed partition size. In another aspect of the invention, the managing step can include assigning different cache aging processes to entries in the cache. Each cache entry of like value can share a particular one of the different cache aging processes. The aging processes can provide for progressively longer eviction intervals for data having a higher value than other data in the cache. In consequence, cache entries of particular values can be evicted according to corresponding ones of the aging processes.

Finally, in yet another aspect of the present invention, the managing step can include assigning a guaranteed partition size to at least one of the value-based partitions; and, further assigning different cache aging processes to entries in the cache. Each cache entry of like value can share a particular one of the different cache aging processes. The aging processes can provide for progressively longer eviction intervals for data having a higher value than other data in the cache.

Data of like value can be cached in the value-based partition having the guaranteed partition size. Similarly, data of disparate value can be cached in vacant space in the value-based partition having the guaranteed partition size. Yet, cache entries of particular values can be evicted according to corresponding ones of the aging processes. Moreover, cache entries previously stored in the vacant space in the value-based partition having the guaranteed partition size can be evicted where no vacancies exist in the value-based partition having the guaranteed partition size which can accommodate the caching of the data of like value in the value-based partition having the guaranteed partition size.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a value-based caching process and system. In a value-based cache, a cache can be partitioned according to different value-based classifications corresponding to different data or customer values. For simplicity of explanation, in the foregoing specification three classifications, gold, silver and bronze, are illustrated though it is to be understood that the invention is not so limited to any particular classification scheme and any other classification scheme utilized as part of a differential computing policy can suffice in order to provide differentiated service levels to different customers or different data. In any case, the cache replacement policy for each of the partitions can vary according to the value of the data stored therein.

Specifically, the cache replacement policy can provide for greater relative cache tenancies for cached data where the cached data is of higher value than other cached data in other partitions of lesser value. In this way, for cached data of higher value, it will be more likely that a request for such cached data can be satisfied by the cached data before the cached data is evicted from the cache partition in order to satisfy the caching of other similarly-valued data. Three exemplary cache replacement policies are illustrated herein: a replacement policy which guarantees a certain quantity of storage for cached data of a specified value, an LRU replacement policy which guarantees a slower rate of decay for higher-valued cached data of higher value, and a policy which combines the features of the LRU replacement policy and the space guarantee replacement policy.

Figure 1A:
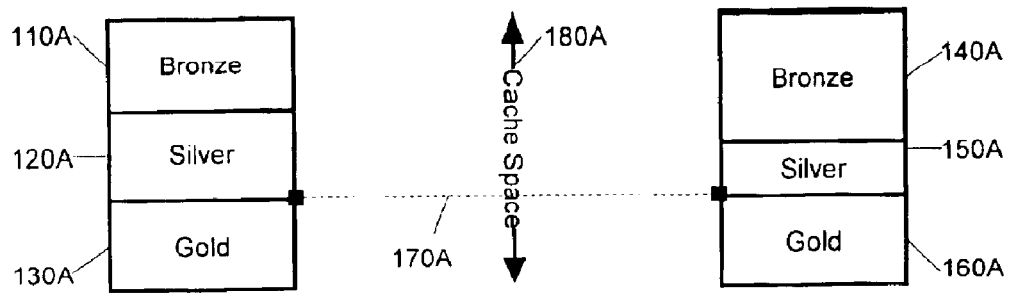
FIG. 1A is a schematic illustration of a value partitioned cache managed according to a value-based space management protocol of the present invention.

FIG. 1A is a schematic illustration of a value partitioned cache managed according to a value-based space management protocol of the present invention. In the value partitioned cache, the entire cache space 180 can be partitioned among cached data having different values. For example, initially, highly-valued gold data can be cached in a gold partition 130A. Lesser-valued silver data can be cached in the silver partition 120A. Finally, yet lesser-valued bronze data can be cached in the bronze partition 110A. Notably, though each of the partitions 110A, 120A, 130A are shown to be of equal size and allocation, it should be understood that any initial configuration can suffice and the partitions 110A, 120A, 130A need not be initially configured to have contiguous storage and equal size.

Significantly, in the value-based space management protocol of FIG. 1A, a space guarantee 170A can be enforced in which a cache partition such as the gold partition 130A is guaranteed a minimum size shown as partition 160A. That is to say, regardless of the cache replacement activities of the bronze and silver partitions 140A, 150A, the size of the gold partition 160A will remain constant, even where cache space remains unused in the gold partition 130A while substantial caching activities in the other partitions 110A, 120A result in cache evictions. Hence, as illustrated in FIG. 1A, where caching activities of bronze valued data result in additional required caching space which exceeds the initial allocation of the bronze partition 110, an expanded bronze partition 140A can be provided at the expense of the silver partition 150A while the size of the gold partition 160A remains constant.

Importantly, as one skilled in the art will recognize, the unused portions of the gold partition 160A will serve to enhance the likelihood that as additional gold-valued data is cached in the gold partition 160A, existing gold-valued data which had been previously cached in the gold partition 160A will not be subject to an untimely eviction. As a result, subsequent requests for the un-evicted cached data in the gold partition 160A can be satisfied from the cache without requiring the retrieval of the requested, gold-valued data from non-cache storage. Thus, the gold-valued data will have received favorable treatment as the gold-valued data has a perceived relative value which exceeds that of the bronze and silver valued data.

The space management replacement protocol illustrated in FIG. 1A can prove to be inefficient where the space guarantee 170A far exceeds the level required to provide suitable data retrieval responsiveness for gold-valued data or gold-valued customers. Thus, it is anticipated that the space guarantee 170A can be selectively configured to provide an optimal level of responsiveness. Nevertheless, in accordance with the inventive arrangements, a dynamic, LRU cache replacement policy can provide an optimum level of responsiveness asymptotically and provides a level of fairness for lesser valued data which can exceed that of the space guarantee 170A of FIG. 1A.

Figure 1B:
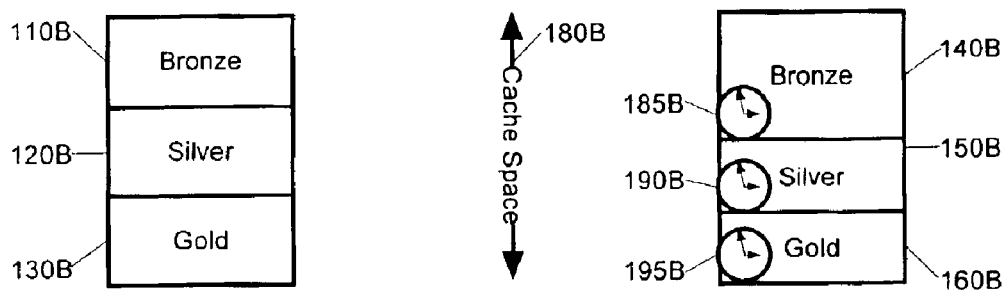
FIG. 1B is a schematic illustration of a value partitioned cache managed according to a value-based LRU protocol of the present invention.

FIG. 1B is a schematic illustration of a value partitioned cache managed according to a value-based LRU protocol of the present invention. In a value-based LRU protocol, the aging time of cache entries of different values can vary, with the most valuable of cache entries aging slower than less valuable cache entries. For example, initially the entire cache space 180B can be partitioned among bronze, silver and gold partitions 110B, 120B, 130B. At each caching interval the individual cache entries in each of the bronze, silver and gold partitions 110B, 120B, 130B can each at different paces.

Specifically, while cache entries in the bronze partition 110B can expire according to a first LRU aging process 185B specified by the equation, $T_{expiration}=x$, where x is a first time interval, cache entries in the silver partition 120B can expire according to a second, slower LRU aging process 190B specified by the equation $T'_{expiration}=T_{expiration}+y$, where y is a another time interval. Finally, the cache entries in the gold partition 130B can expire according to the even slower LRU aging process 195B specified by the equation $T''_{expiration}=T'_{expiration}+z$, where z is yet another time interval. Thus, as it will be apparent to one skilled in the art, the cache entries in the gold partition 130B will persist longer than cache entries in the silver partition 120B, which will persist longer than cache entries in the bronze partition 110B.

Importantly, in light of the LRU cache eviction protocol of the present invention, where there are fewer requests for data cached in the silver partition 120B, and yet fewer requests for data cached in the gold partition 130B, it can be expected that, subsequent to the caching interval, slowly the bronze partition 140B will expand in size, encroaching upon the silver and gold partitions 150B, 160B. Likewise, the silver partition ultimately will expand in size, encroaching upon the gold partition 160B. Therefore, while it cannot be expected that the gold partition 160B always remain the same size, the shrinking of the gold partition 160B can be dampened asymptotically simply by varying the aging variables x, y and z, providing an enhanced responsiveness for gold-valued data cached in the gold partition 160B.

Figure 1C:
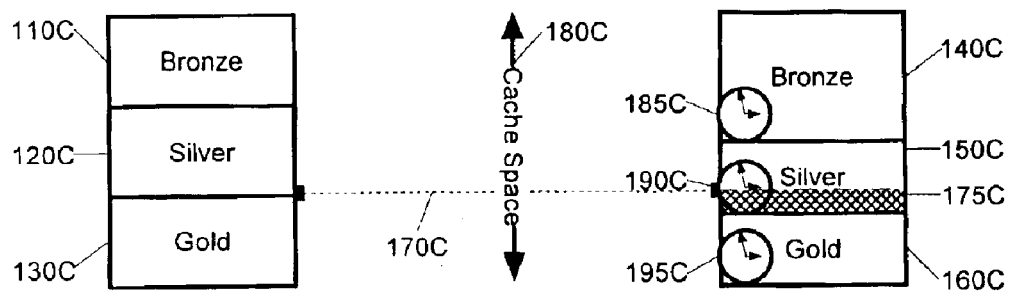
FIG. 1C is a schematic illustration of a value partitioned cache managed according to a combined value-based space management and LRU protocol of the present invention.

It is a distinct advantage of the present invention that the foregoing space management and LRU protocols can be combined into a single cache replacement policy. In that regard, FIG. 1C is a schematic illustration of a value partitioned cache managed according to a combined value-based space management and LRU protocol of the present invention. In the combined protocol, the cache space 180C once again can be partitioned into bronze, silver and gold partitions 110C, 120C, 130C, respectively. As in the case of the space management protocol, a fixed partition size 170C can be established for the gold partition 130C. Yet, separate, progressively dependent aging processes 185C, 190C, 195C can be associated with each of the bronze, silver and gold partitions 110C, 120C, 130C.

During the caching interval in which cache evictions are determined according to the aging processes 185C, 190C, 195C, cache vacancies will arise in each of the bronze, silver and gold partitions 140C, 150C, 160C. As it can be expected that more requests for bronze-valued data will be processed in the cache than gold and silver-valued data, bronze-valued data will be cached in the vacant space in the cache, even if the vacant space only is available in the gold or silver partitions 150C, 160C. For instance, as shown in the illustration, silver-valued data has been cached in vacant space 175C associated with the gold partition 160C.

Unlike the LRU protocol of FIG. 1B, however, in the combined protocol of FIG. 1C, the gold partition 160C is of guaranteed, fixed partition size 170C, though permitting the use of unused portions of the gold partition 160C is of no consequence so long as the remaining portion of the gold partition 160C can accommodate gold-valued data. Where no space remains in the gold partition 160C, however, bronze or silver-valued data stored in the vacant space 175C can be summarily evicted in order to accommodate the caching of gold-valued data in the gold partition 160C which had been guaranteed to be of a fixed size 170C.

Figure 2:
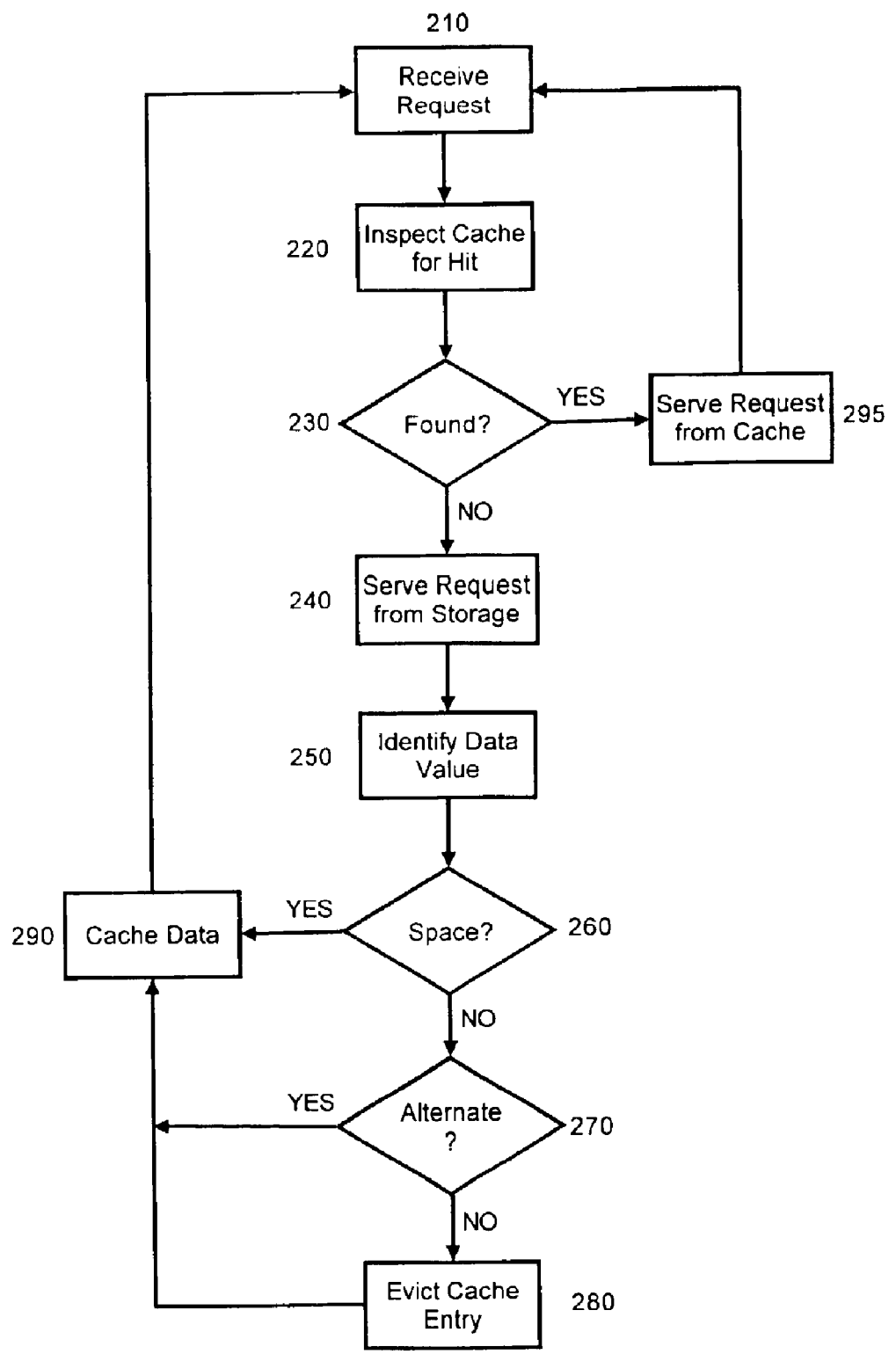
FIG. 2 is a flow chart illustrating a process for performing value-based caching according to either or both of the value-based LRU and space management protocols illustrated in FIGS. 1A through 1C.

FIG. 2 is a flow chart illustrating a process for performing value-based caching according to either or both of the value-based LRU and space management protocols illustrated in FIGS. 1A through 1C. Beginning in block 210, a request can be received in consequence of which data is to be produced, generated or retrieved. In block 220, before undertaking the production, generation or retrieval process, the cache can be inspected to determine whether the request can be satisfied from previously cached data. If the data can be located in the cache in decision block 230, in block 295 the request can be served with the located data and the process can return to block 210.

In decision block 230, if the request cannot be satisfied from previously cached data, the request can be serviced in block 240 by undertaking the required production, generation or retrieval process. For instance, the data can be retrieved from fixed storage. Alternatively, logic can execute the result of which can produce the data. In any case, the value of the data can be determined in block 250. Specifically, the value can be rated relative to other data. For example, the identity of the requestor might result in a specific valuation for the data. Alternatively, the identity of the provider of the data might result in a specific valuation of the data. Finally, the type of data itself might result in a specific valuation.

In any case, based upon the valuation of the data, a suitable partition in the cache can be identified and it can be determined in decision block 260 whether any vacancies exist in the corresponding cache partition. If so, in block 290 the data can be cached in the corresponding partition and the process can return to block 210. Otherwise, in decision block 270 it can be further determined whether any vacancies exist in another partition associated with a valuation which differs from the valuation of the data. If so, in block 290 the data can be cached in the alternative partition with the understanding that the data will be subsequently evicted in favor of data having a valuation corresponding to the selected partition should the need arise. Finally, if no vacancies can be identified in alternative partitions, in block 280 a cache entry in the corresponding partition can be evicted and the data can be cached in block 290 in the corresponding partition.

Figure 3A:
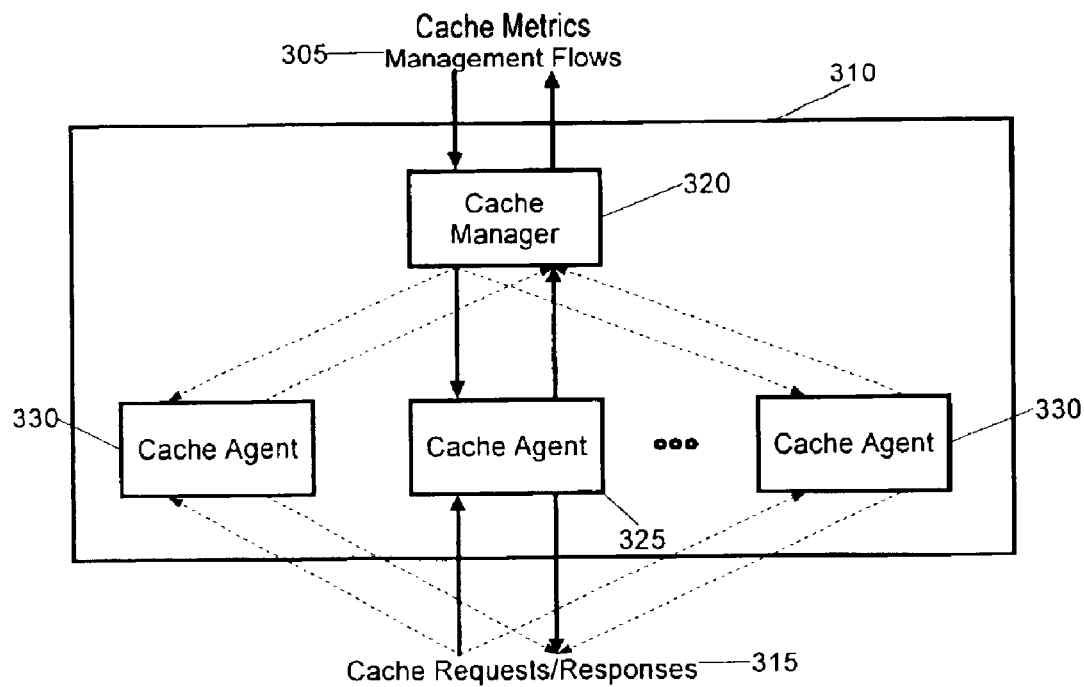
FIG. 3A is a block illustration of a value-based caching system in which one or more cache agents manage the value-based caching process of FIG. 2 in one or more physical caching platforms; and, FIG. 3B is a block illustration of a value-based caching system in which a cache agent manages value-based caching across one or more cache sub-agents in a cache cluster or storage sub-system.

FIG. 3A is a block illustration of a value-based cache in which one or more cache agents manage the value-based caching process of FIG. 2 in one or more physical caching platforms. In that regard, the value-based cache of the present invention can include a cache manager 320 and one or more cache agents 325 disposed about a single, physical platform 310. The caching manager 320 can receive and interpret value metrics 305 with the context of the caching environment. The metrics can be received statically, through a configuration file, or dynamically through a management application. In either case, the caching manager 320 can specify suitable partition types and sizes, as well as aging processes.

The caching agent 325 can control the caching of data in the cache itself by responding to cache requests 315. Specifically, the cache agents 325 can service requests 315 with data stored in the cache. Moreover, the cache agents 325 can control both the caching of data in suitable cache partitions according to the value metrics specified by the cache manager 320, and also the eviction of cache entries according to the value metrics specified by the cache manager 320. Notably, minimally, a single cache manager 320 can control a single cache agent 325. In other embodiments, the single cache manager 320 can control other cache agents 330 distributed about a computer communications network. Importantly, the cache manager 320 can apply different value metrics to individual cache agents 325, 330 controlled by the cache manager 320.

Figure 3B:
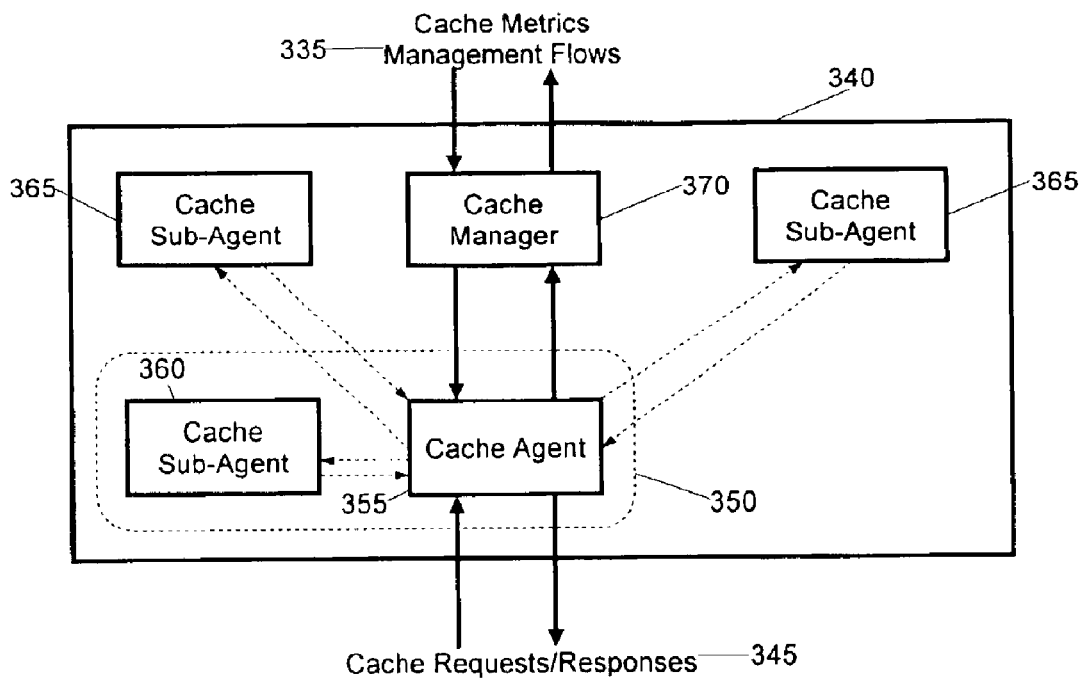

In one significant aspect of the present invention, a Quality of Access (QoA) cache cluster 340 can be provided in which cache value metrics can correlate to different physical cache spaces. In that regard, FIG. 3B is a block illustration of a value-based caching system in which a cache agent manages value-based caching across one or more cache sub-agents in a cache cluster or storage subsystem. In FIG. 3B, a cache manager 370 can be provided which can specify cache value metrics to a cache agent 355 disposed in memory 350. Communicatively linked sub-agents 360 can operate in a particular cache space and can process cache requests 345 received from the cache agent 355 based upon cache metrics 335 provided to the cache manager. Notably, as in the case of FIG. 3A, other cache sub-agents 365 distributed about a computer communications network can be controlled by the cache agent 355.

Notably, the cache metrics 335 can include metrics which relate to the media type of the cache space, such as latency, aggregate throughput and locality. As the cache sub-agents 360, 365 operate in particular cache spaces, the QoA for a particular cache value metric can correlate to a specific media type. User defined values derived from the data, the requester or the network can map directly or indirectly via the policy for a particular media type. For instance, as listed in descending order of value, media classifications such as fast memory, slow memory, local database access and remote database access can be defined.

As will be recognized by one skilled in the art, a QoA-based cache cluster can appear externally as a single cache engine, though the responsiveness of the cache for data of varying valuations can be controlled according to cache media type. Thus, the QoA-based cache cluster can be extended to emerging storage technologies, such as a storage area network (SAN). In that case, the SAN can provide a storage media classification based upon user value and can operate under the control of the cache manager 370, a suitable cache agent 355 and associated subagents 360, 365.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A value based cache method comprising the steps of:
   partitioning a cache into a plurality of different value-based partitions;
   valuing data to be stored in said cache;
   assigning a guaranteed partition size to at least one of said value-based partitions;
   further assigning different cache aging processes to entries in said cache, each cache entry of like value sharing a particular one of said different cache aging processes, said aging processes providing for progressively longer eviction intervals for data having a higher value than other data in said cache;
   caching data of like value in said value-based partition having said guaranteed partition size;
   further caching data of disparate value in vacant space in said value-based partition having said guaranteed partition size;
   evicting cache entries of particular values from said value-based partitions according to corresponding ones of said aging processes; and,
   further evicting cache entries previously stored in said vacant space in said value-based partition having said guaranteed partition size where no vacancies exist in said value-based partition having said guaranteed partition size which can accommodate said caching of said data of like value in said value-based partition having said guaranteed partition size.

2. A machine readable storage having stored thereon a computer program for value based caching, said computer program comprising a routine set of instructions for causing the machine to perform the steps of:
   partitioning a cache into a plurality of different value-based partitions;
   valuing data to be stored in said cache;
   assigning a guaranteed partition size to at least one of said value-based partitions;
   further assigning different cache aging processes to entries in said cache, each cache entry of like value sharing a particular one of said different cache aging processes, said aging processes providing for progressively longer eviction intervals for data having a higher value than other data in said cache;
   caching data of like value in said value-based partition having said guaranteed partition size;
   further caching data of disparate value in vacant space in said value-based partition having said guaranteed partition size;
   evicting cache entries of particular values from said value-based partitions according to corresponding ones of said aging processes; and,
   further evicting cache entries previously stored in said vacant space in said value-based partition having said guaranteed partition size where no vacancies exist in said value-based partition having said guaranteed partition size which can accommodate said caching of said data of like value in said value-based partition having said guaranteed partition size.

3. A value-based caching system comprising:
   a cache manager;
   at least one cache agent controlled by said cache manager;
   said cache manager communicating value metrics to said at least one cache agent, each one of said at least one cache agents caching data and evicting cache entries according to measured values of said data and cache entries and said value metrics provided by said cache manager; and,
   a plurality of cache sub-agents disposed in varying media types and controlled by at least one of said at least one cache agents;
   said value metrics specifying Quality of Access for said varying media types, said cache agents assigning individual ones of said controlled cache sub-agents to handle cache requests.

4. The value-based caching system of claim 3, wherein said plurality of cache sub-agents and said controlling at least one cache agent are disposed in a storage area network (SAN).

* * * * *

UNITED STATES PATENT AND TRADEMARK OFFICE
CERTIFICATE OF CORRECTION

PATENT NO. : 6,944,715 B2
DATED : September 13, 2005
INVENTOR(S) : Edward G. Britton et al.

It is certified that error appears in the above-identified patent and that said Letters Patent is hereby corrected as shown below:

Column 1,
Line 56, following "however," replace "In" with -- in --.

Column 2,
Line 4, replace "in as much" with -- inasmuch --.
Line 7, insert -- , -- after "present".
Line 15, replace "value based" with -- value-based --.

Column 4,
Line 55, insert -- be -- between "each" and "at".

Signed and Sealed this

Seventh Day of February, 2006

JON W. DUDAS
*Director of the United States Patent and Trademark Office*